US005341505A

United States Patent [19]

Whitehouse

[11] Patent Number: 5,341,505

[45] Date of Patent: Aug. 23, 1994

[54] SYSTEM AND METHOD FOR ACCESSING REMOTELY LOCATED ZIP+4 ZIPCODE DATABASE

[76] Inventor: Harry T. Whitehouse, 70 Hayfield Rd., Portola Valley, Calif. 94028-7249

[21] Appl. No.: 605,649

[22] Filed: Oct. 30, 1990

[51] Int. Cl.[5] .......................... G06F 3/12; G06F 15/20

[52] U.S. Cl. ................................ 395/800; 364/464.02; 364/918.52; 364/931.4; 364/DIG. 2; 340/825.27

[58] Field of Search ................ 395/800, 200; 235/381; 364/464.03, 464.02, 550, 478, 900, ; 379/67, 107; 340/825.27

[56] References Cited

U.S. PATENT DOCUMENTS

| | | | |
|---|---|---|---|
| 4,122,532 | 10/1978 | Dlugos et al. | 364/464.02 |
| 4,597,058 | 6/1986 | Izumi et al. | 364/900 |
| 4,743,747 | 5/1988 | Fougere et al. | 235/494 |
| 4,780,835 | 10/1988 | Sievel et al. | 364/550 |
| 4,800,506 | 1/1989 | Axelrod et al. | 364/478 |
| 4,868,570 | 9/1989 | Davis | 341/106 |
| 4,868,757 | 9/1989 | Gil | 364/464.03 |
| 4,979,206 | 12/1990 | Padden et al. | 379/67 |
| 5,058,108 | 10/1991 | Mann et al. | 370/85.1 |
| 5,065,000 | 11/1991 | Pusic | 235/381 |
| 5,124,909 | 6/1992 | Blakely et al. | 395/200 |
| 5,128,988 | 7/1992 | Cowell et al. | 379/107 |
| 5,146,544 | 9/1992 | Altham et al. | 395/114 |
| 5,146,561 | 9/1992 | Carey et al. | 395/200 |
| 5,165,020 | 11/1992 | Sudama et al. | 395/200 |

*Primary Examiner*—Alyssa H. Bowler
*Assistant Examiner*—Meng-Ai T. An
*Attorney, Agent, or Firm*—Flehr, Hohbach, Test, Albritton & Herbert

[57] ABSTRACT

A distributed computer system enables end-users without direct access to a ZIP+4 database to obtain ZIP+4 zipcode values for specified addresses from a remotely located computer having a ZIP+4 database. The remotely located computer includes a modem for receiving calls from end-user's computers and a ZIP+4 database with query response software for transmitting ZIP+4 zipcode values retrieved from its ZIP+4 database in response to address information received from end-user computers. End-user computers that utilize the remotely located ZIP+4 database each include a modem for communicating with the remotely located ZIP+4 database computer, an address input program for storing address information input by a user, and a remote zipcode retrieval program for transmitting via the modem the stored address information to the remotely located ZIP+4 database computer and for receiving ZIP+4 zipcode values from the remotely located computer. The end-user computers preferably include a printer, and an envelope printing program for directing the printer to print ZIP+4 barcodes on envelopes, as well as other post-office mandated artwork. The address input program on the end-user's computer preferably is linked to the remote zipcode retrieval program such that a single predefined keystroke by the user causes the end-user's computer to call the remotely located computer, send a specified set of address information, receive ZIP+4 zipcode values, and insert the received ZIP+4 zipcode values into the stored address information.

9 Claims, 6 Drawing Sheets

FOR ADDITIONAL INFORMATION,
PLEASE CONTACT THE USPS
REPRESENTATIVE BELOW.

ALIGN
WITH
UPPER
RIGHT
CORNER

UNITED STATES POSTAL SERVICE
Office of Address Information Systems
Washington, D.C. 20260-7230

TO BE USED ONLY WITH FIM - A (Courtesy Reply Mail)
AND ZIP CODE: 94301-1041

CAUTION:

USE ONLY FOR ADDRESS BEARING THE ZIP+4 CODE ABOVE. SEE PUBLICATION 25 FOR PRINTING REQUIREMENTS.

ALIGN
WITH
LOWER
RIGHT
CORNER

THIS POSITIVE PREPARED FOR: P.S.I. ASSOCIATES

Figure 2

SYSTEM AND METHOD FOR ACCESSING REMOTELY LOCATED ZIP+4 ZIPCODE DATABASE

BACKGROUND OF THE INVENTION

Field of the Invention

This invention relates to the processing of mail in the United States and its territories. More particularly, the invention focuses on means to quickly and inexpensively access ZIP+4 information and then print US Postal Service POSTNET bar-coded mail pieces in small and medium quantities in typical small office and departmental environments.

Goals of the United States Postal Service

Since 1988, the stated operational focus of the U.S. Postal Service has been to have all of the U.S. mail volume pre-barcoded by 1995. The barcode employed by the U.S.P.S. mail processing equipment is known as POSTNET, and is comprised of a series of short and long bars which encode a ZIP+4 for a given address. This barcode sequence can be presently seen on certain types of mail pieces today—particularly business reply and courtesy reply (payment) envelopes.

A barcode option which will begin to be supported by the U.S.P.S. in 1991 is the advanced barcode or "ABC". The advanced barcode begins with the barcode representation of the ZIP+4 and adds the barcode equivalent of the last two numbers of the street address for even further sorting resolution. Pre-barcoded mail is seen to be a critical factor in controlling U.S. postage costs. Some 80% of the current $40+ billion dollar U.S.P.S. budget is allocated to employee payroll—mostly mail carriers. The U.S.P.S. has a staff roster of over 800,000 men and women, and a typical mail carrier currently spends 50% of his or her work day sorting mail by hand before walking or driving the actual delivery route. Barcoding is expected to reduce carrier sorting time by 25–50%, as ABC barcoded mail can be sorted by machine to the sequence in which the carrier travels his or her route.

The barcode reading and sorting technology is present in all major mail processing facilities nationwide. Mail which is not pre-barcoded is first sent through a complex optical character reading machine (OCR) which captures an image of the typed or hand written address, converts this image to text, looks up the address in a 4 billion character national ZIP+4 street data base, and "sprays" the barcode equivalent of the ZIP+4 on the envelope.

After the OCR stage, the mail is then sorted by significantly less expensive barcode sorter (BCS) equipment.

The goal to pre-barcode all of the U.S. mail volume by 1995 is essentially an effort to reduce the expensive and relatively slow OCR step. The U.S.P.S. estimates that a savings of 60 to 80 million dollars per year will be achieved for each 1 percent of the mail volume which is pre-barcoded. These savings will be directly reflected in future postage prices, as the U.S.P.S. has operated since 1973 as a quasi-government agency with full responsibility for its own budget.

The savings are so dramatic that the U.S.P.S. will be offering a user discount of up to 5.7 cents for each First Class pre-barcoded mail piece effective with the February, 1991 rate increase. Under these new rates, the nominal First Class postage will be 30 cents.

Mail That is Easy to Barcode

The lay person can readily see examples of the POSTNET barcode by examining the daily mail received at his or her home or work place. Credit card or mortgage payments often are accompanied with a preaddressed payment mailer which is directed towards a central deposit point. The U.S.P.S. has been very successful in obtaining the cooperation of businesses in placing the barcode representation of this deposit address since it is a simple addition the master artwork generated for the envelope. The U.S.P.S. will provide a graphic POSTNET representation of any ZIP+4 without charge to a requester. The requester then includes this marking on their envelope artwork, which is replicated by the thousands or millions.

Another common example of pre-barcoded mail is the business reply postcard. If one examines any popular magazine, tear-out postcards with pre-paid postage will be found throughout the publication. Most of these will contain a barcode as, once again, all cards will be delivered to a single address and the additional work in developing the barcode artwork is minimal.

Mail That Is Difficult to Barcode

The examples described in the previous section have a common theme. They involve many mail pieces which are being sent from a wide geographic spectrum but delivered to a common destination.

The reverse scenario is tremendously more difficult. A typical outbound mailing pattern for a small or medium size business will see mail travel to many disparate addresses in different towns and states. In fact, it is rare that two pieces of mail will be going to the same place (else they would be combined in a single package and mailed as one). To pre-barcode this mail stream means that the ZIP+4 must be obtained for each destination and that unique barcode must be applied to that particular envelope or label directed towards that destination.

The Magnitude of the ZIP+4 Data Base

The ZIP+4 configuration uses the first five digits to identify the city of destination. There are some 80,000 cities in the United States—a very manageable number for today's personal computers or even manual lookup. Prior to the advent of ZIP+4, a complete national list of 5 digit ZIP codes could be distributed in a phonebook sized format.

The additional "+4" digits identify the street, the side of the street, and in some cases a particular company in a given building. As one can readily imagine, a data base containing this detail is massive. In terms of computer storage, the uncompressed data file size is on the order of 4 gigabytes—roughly equivalent to the amount of data which could be (impractically) contained on 200 personal computers each with a 20 megabyte hard disk (typical of an office PC). In terms of printed matter, the national list of ZIP+4's could entirely fill a typical office room.

The national ZIP+4 data base is maintained by the United States Postal Service. Local Address Information Specialists continue to monitor new construction and renovation in their respective areas, modifying or assigning new ZIP+4 information to addressees as required. These local data are feed to a central ZIP+4 repository maintained at the U.S.P.S. Postal Data Center in San Mateo, Calif.

The U.S.P.S. will provide magnetic tapes of this massive data base to those requesting it. Several firms, including First Data Resources and Group One, convert these data to compact-disk format (often called CD-ROM—similar to an audio CD) and distribute them to subscribers for use in managing large data base mailing system. The Postal Service will soon be producing and distributing a CD-ROM version of the data base themselves. However, the CD reader is an expensive addition to a computer system (about $800 per PC) and the subscription cost for the CD's (issued monthly) is about $2400/year.

Who Currently Uses ZIP+4 on Outbound Mail?

Given the massive amount of data in the national ZIP+4 data base, only large, well-capitalized firms with extensive computer resources and highly specialized printers can generate ZIP+4, pre-barcoded outbound mail. And the only mailings amenable to such automated procedures are, in every sense, mass mailings.

The U.S. Postal Services encourages the pre-barcoding by offering a per-piece discount to mailers. In February of 1991, this discount will be over 5 cents per First Class mall pieces (30 cents normal). To further encourage such mailers, the U.S.P.S. offers an unprecedented, free service to review any firm's computerized mailing list for correctness and to append proper ZIP+4 codes to their data bases.

The Critical Missing Link in U.S.P.S. Strategy

The goal of obtaining a 95% pre-barcoded mail stream by 1995 is threatened by the demographics of mail sources. FIG. 1 presents data gathered by the U.S.P.S. showing the breakdown of mail volume by source.

Note that 200 so-called key national accounts represent nearly ¼ of the 125 billion pieces of mail processed annually. Key national accounts include several Federal Agencies, Sears, the Armed Forces and the U.S.P.S. itself.

The next category, key major accounts, is comprised of 40,000 large mass mailers who have a reasonable automation posture to support ZIP+4 barcoding. Included here are major banks, department store chains, etc.

The third category accounts for 30% of the mail volume, but is distributed over 8,000,000 separate entities (small and medium businesses). Finally, the remaining 18% of the mail volume is generated by household mailers.

The missing link in the U.S.P.S. strategy relates to the two last categories, as well as a fraction of personnel working within the first two categories who are not involved in the mass mailing processes. These mailers do not have access to ZIP+4 information—save a time consuming trip or call to the nearest U.S.P.S. office. Most post offices currently must look through large telephone-size books to answer ZIP+4 queries. The examiner might call his or her local most office to ascertain the amount of time required to obtain his or her home ZIP+4 with this manual method. Some larger post offices have ZIP+4 CD-ROM lookup PC's and will allocate staff to answer phone queries using this technology. However, the time required for a nonetheless "manual" lookup is not insignificant and manpower constraints substantially limit the number of U.S.P.S. personnel which can be assigned to this type of information dissemination.

For several years, the U.S.P.S. offered a nationwide "800-number" for ZIP+4 queries, but this too was discontinued due to the expense.

Smaller mailers, while creating a tremendous fraction (30+%) of the mail volume in aggregate, do not have the money or specialized computer equipment to maintain a readily-accessible ZIP+4 data base of the size discussed. Finally, until very recently, this class of mailers didn't even have means to apply the barcode to individual mail pieces.

Barcoding with DeskTop Laser Printers —Envelope Manager Software

Currently, there are well over 3,000,000 desktop laser printers in operation throughout the United States. Most are connected to personal computers or PC networks, and are used primarily for the generation of correspondence. Of new computer printers sold, some 65% are laser printers—a percentage which has been steadily increasing since their introduction about 5 years ago. Prices have fallen from approximately $3500 when first introduced, to below $800 for some of the newest 4 page per minute printers. Manufacturers who currently offer desktop laser printers in this multi-billion dollar/year market include Hewlett-Packard (the earliest entrant and now dominant player), IBM, Canon, Texas Instruments, QMS, Epson, Toshiba, Sharp, Wang, Xerox, Qume, Tandy, NCR, NEC, Brother and Panasonic.

Since December of 1989, the applicant has been marketing a product which uses this widely available printer technology to produce POSTNET bar-coded envelopes and labels on demand. A copy of the software product, Envelope Manager, is included with this application. The examiner is encouraged to utilize this software package in his or her daily correspondence to gain a broader understanding of the invention which will be described momentarily.

Envelope Manager software is currently being used nationwide by the U.S.P.S. as a means to barcode their outgoing first class business mail. It is also being used by U.S.P.S. marketing specialists to expedite the production of mailer artwork for volume mailers (reducing a 10 day turnaround to 5 minutes). Site licenses have been granted for the U.S.P.S. Headquarters complex and all U.S.P.S. buildings within 35 miles of L'Enfant Plaza, Washington, D.C., as well as with a variety of Air Force, Navy and State Government agencies. These initial sales have been achieved with no media advertising.

Envelope Manager has just announced a new version of the software which interfaces with the previously-mentioned CD-ROM based ZIP+4 data base. This will run both on a stand-alone PC and a Local Area Network (LAN). However, the costs are still substantial ($800/drive and $2400/year CD ROM subscription) for the vast majority of mailers.

Essentially, the invention to be described here is a novel extension to the existing Envelope Manager software which uses the combined environment of a PC, desktop printer, and a PC modem to inexpensively access ZIP+4 data on an as-needed basis. It primarily addresses the 8,000,000 small and medium mailers categorized by the U.S.P.S., as well as particular segments of the mass mailer market and residential sector. A sub-claim of the invention focuses on the issue of graphic artwork generation for designers which utilizes both the ZIP+4 access technology discussed above and some unique software capabilities of the Envelope Manager software.

A Special User Community: Mail Piece Graphic Designers

This invention enumerates a unique sub-claim which addresses a subset of persons associated with the mailing industry. Graphics designers, envelope manufacturers, and printers often provide graphic layout services to clients requiring business reply, courtesy reply, or bulk mail pieces. The designer currently faces a fairly time-consuming process which consists of the following:

1. The designer must contact the local U.S.P.S. Marketing Division to obtain the correct ZIP+4 for the mail piece and a specimen of the POSTNET barcode and FIM (facing identification mark). The local U.S.P.S. marketing division has historically submitted the barcode art request to the U.S.P.S. Address Information Branch in Memphis, Tenn., and 5 to 10 days later the marketing representative will receive a U.S.P.S. "positive" as depicted in FIG. 2.

2. The designer is mailed (or may pick up) the positive and then proceeds to cut out the POSTNET barcode and FIM and lay them up on the main artwork for the mailer. The designer must carefully adhere to the POSTNET barcode and FIM dimensional placement requirements specified by the U.S.P.S. In practice, there are often mistakes. FIG. 3 shows typical artwork for a business reply envelope.

3. The designer must order type and related artwork for the envelope.

4. Finally, the artwork may be submitted for approval and bulk reproduction.

The invention presented here reduces this two week process to a five minute exercise. The Envelope Manager software enclosed with this submittal provides a "mechanical art" option which will produce an $8\frac{1}{2}'' \times 11''$ artwork master complete with POSTNET barcode and FIM marking. All critical alignment features are undertaken by the software. A variety of envelope size and mailing configurations (e.g., BULK, COURTESY, REPLY) are supported. Envelope Manager has been increasingly used by U.S.P.S. Marketing specialists nationwide to provide clients with artwork on demand (instead of ordering artwork through Memphis) since the artwork option was first introduced in April of 1990.

One commercial firm will accept telephone or FAX orders for the POSTNET barcode and Express Mail the barcode and FIM artwork to the design by the next business day. However, this process bears both a service charge and an express mailing fee which is well over $30 per query.

The telecommunications-based ZIP+4 query feature submitted in this application remove the last barrier for complete automation of envelope artwork production. The designer may now obtain the correct ZIP+4 for the mail piece in 20 seconds with a single keystroke, and then produce the artwork immediately. With this aspect of the invention, the turn-around time for mailer art is cut to 5 minutes.

SUMMARY OF THE INVENTION

A data management, data exchange, and data communications architecture is offered which brings together a number of common and relatively low-cost computer hardware elements in such a way as to provide quick, easy and low-cost ZIP+4 lookup and subsequent POSTNET barcode printing for small and medium volume mailing operations.

BRIEF DESCRIPTION OF THE DRAWINGS

FIG. 2 depicts a U.S.P.S. positive containing a POSTNET barcode and FIM (facing identification mark).

DESCRIPTION OF THE PREFERRED EMBODIMENTS

Figure 1:
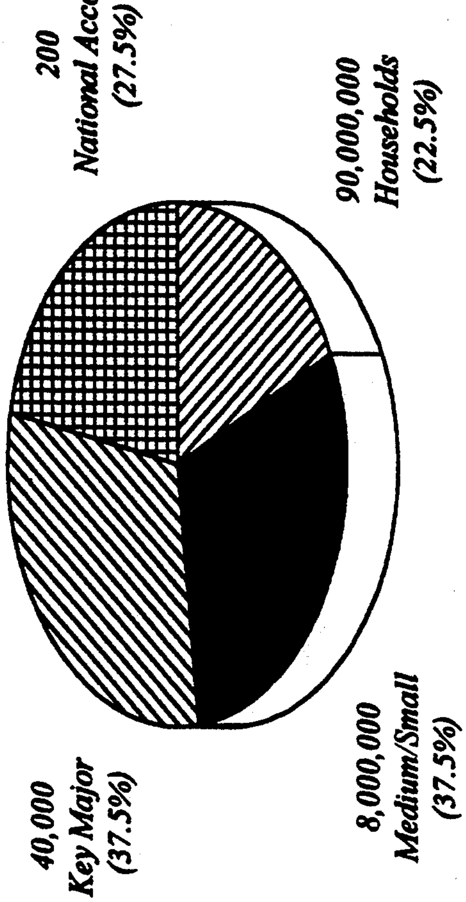
FIG. 1 is a graphical representation of the breakdown of mail volume by source.
Figure 3:
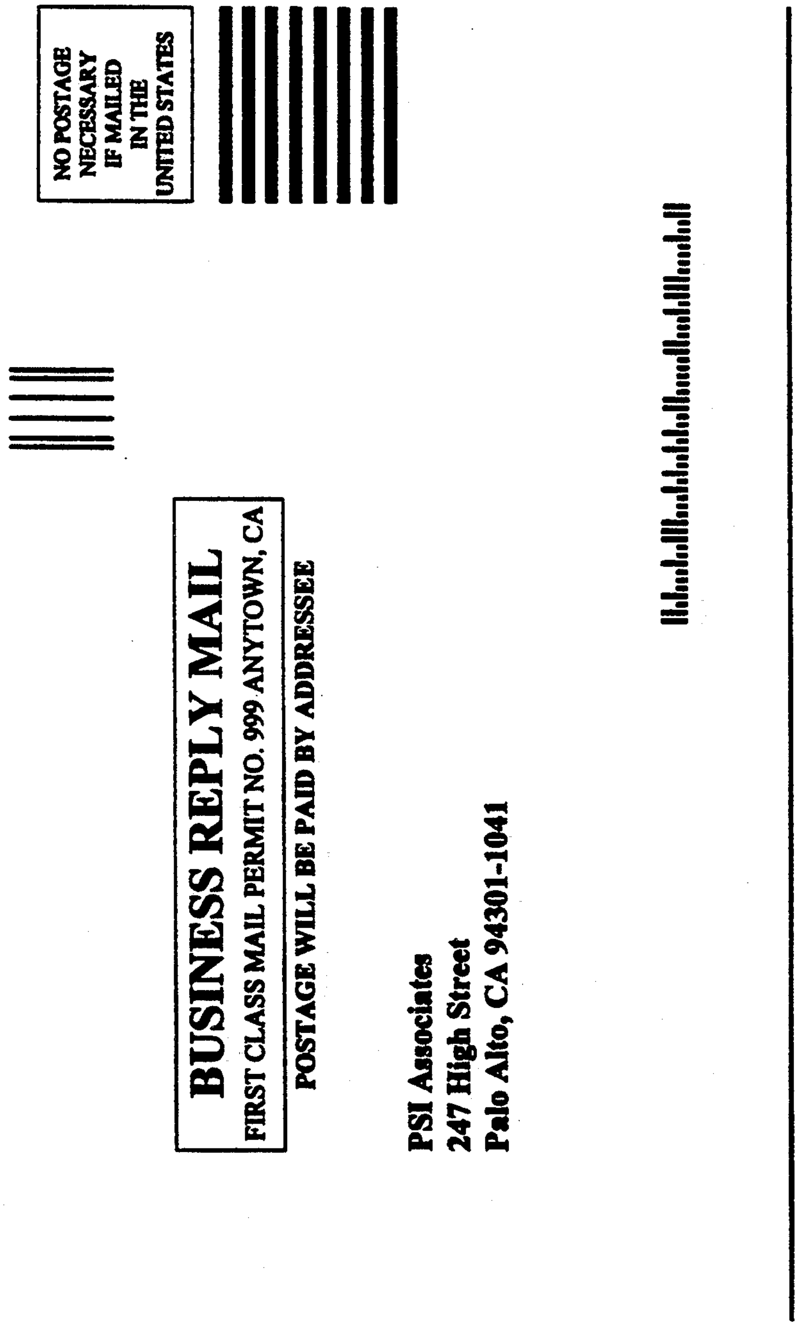
FIG. 3 shows typical artwork for a business reply envelope.
Figure 4:
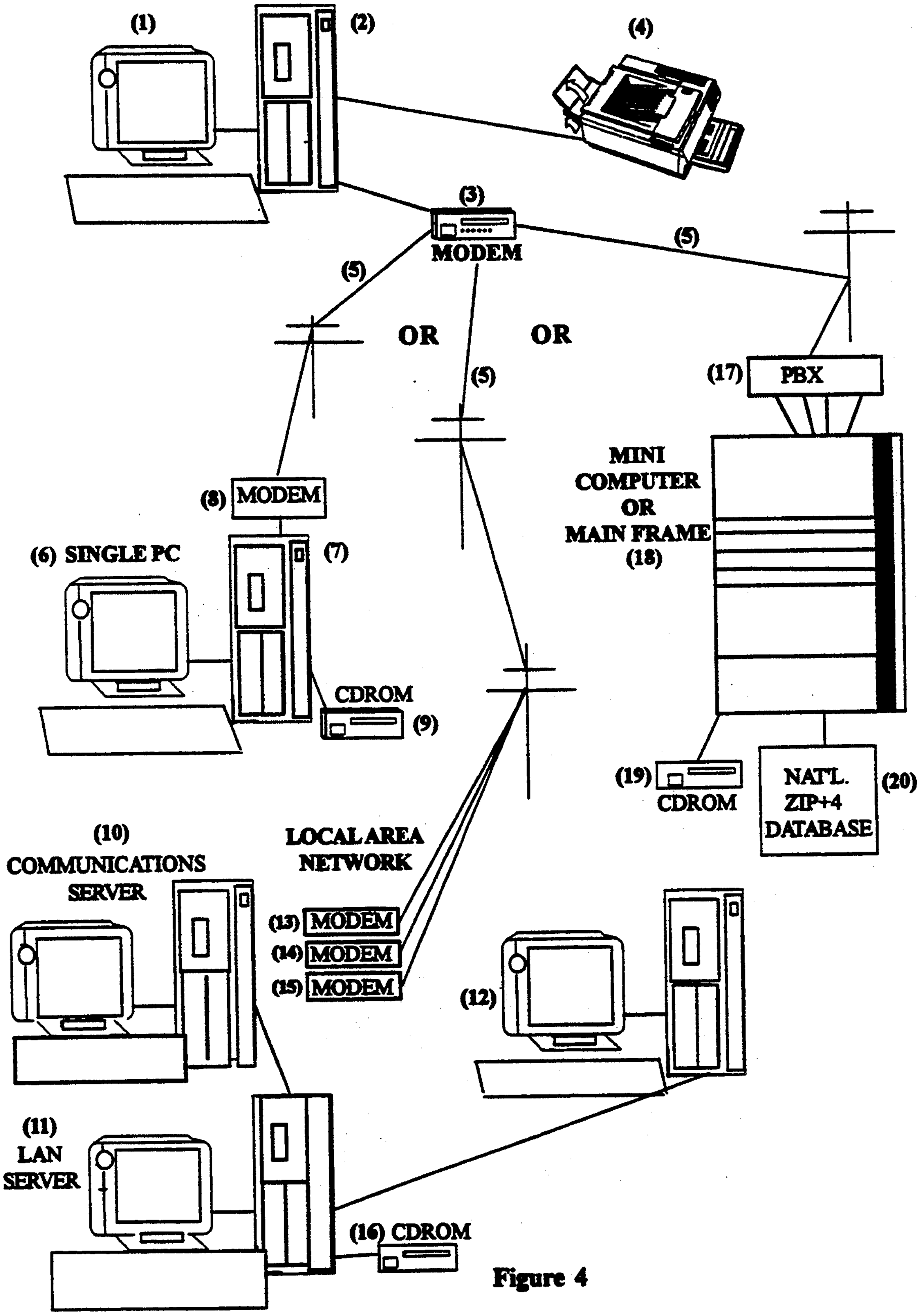
FIG. 4 depicts a single-user computer with communication connections to three types of automated ZIP+4 data repositories.

FIG. 4 illustrates three embodiments of this invention. Common to all three embodiments is a system reflecting a "typical user". The "typical user" is equipped with a personal computer (items 1 and 2), a desktop printer with envelope printing and barcoding capabilities (item 4), POSTNET-capable PC software with address data base storage capabilities and automatic phone dialing capabilities (similar to the Envelope Manager software accompanying this application), and an internal or external telecommunications modem (item 3). Alternatively, this user might also be a "client" on a PC-based Local Area Network(LAN). It is the user of this system which wishes to access a valid ZIP+4 for a particular address.

FIG. 4 shows the single user described above being able to communicate with three types of automated ZIP+4 data repositories.

The lowest-cost automated ZIP+4 query configuration is depicted as items 6, 7, 8 and 9. This is essentially a single-station PC which may be located at a service agency or local post office. It is equipped with an internal or external PC modem (8) with external commercial phone line, a CD-ROM disk with the national ZIP+4 data base (9), and a standard PC with optional monitor (6 and 7). This PC runs a dedicated software product which is, in essence, a companion product to the Envelope Manager software. This receptor software monitors and accepts incoming phone calls, accepts the full address for the query, and replies to the inquiring system with the correct ZIP+4 or an error message. A typical query takes about 20 seconds, with most of the time consumed in dialing and establishing the modem connection.

This low cost query configuration could handle approximately 1500 queries per 8 hour business day, and the operation certainly need not be limited to 8 hours per day. Additional systems could be easily added in response to growing query volume. As the configuration utilizes fundamental PC components, acquisition, setup and on-going maintenance would be minimal.

The second embodiment of the automated ZIP+4 query system ms depicted as "Local Area Network" in FIG. 4 and consists of elements 10 through 16. The principal benefit of this configuration is the ability of a single network-based environment to process concurrent phone calls and share the CD ROM ZIP+4 data base with both external and internal LAN users. LAN configurations can accommodate four modem lines (at minimum), each of which can service an incoming phone query. The actual data lookup on the CD-ROM is only about 3 seconds—most of the 20 second query time involves the modems connecting and "training" on one another. Thus, a multiple line LAN communications system could easily process concurrent queries with a minimal amount of queuing.

The software operating on the communications subserver in the LAN provides the identical function as does the single PC query system described previously. It monitors incoming calls, accepts address queries, and provides ZIP+4 responses. However, the LAN protocol permits this software to service multiple users concurrently.

The third and final embodiment replicates the multiuser serviceability of the LAN system in a mini-computer or mainframe computer environment (items 17 through 20). Here, a PBX phone switching device (17) monitors incoming calls and routes them to the first available mini-computer or mainframe port. In mini- or main-frame environments, it is possible to store the national ZIP+4 data base on large magnetic disk packs or CD ROM (items 19 and 20). This final embodiment, while clearly the most expensive, can service a tremendous number of users and might potentially utilize existing U.S.P.S. computer resources nationwide.

THE USER'S INTERACTION

To further understand how this invention functions, it may be helpful to review the actions of a user who wishes to make the ZIP+4 query.

Figure 5:
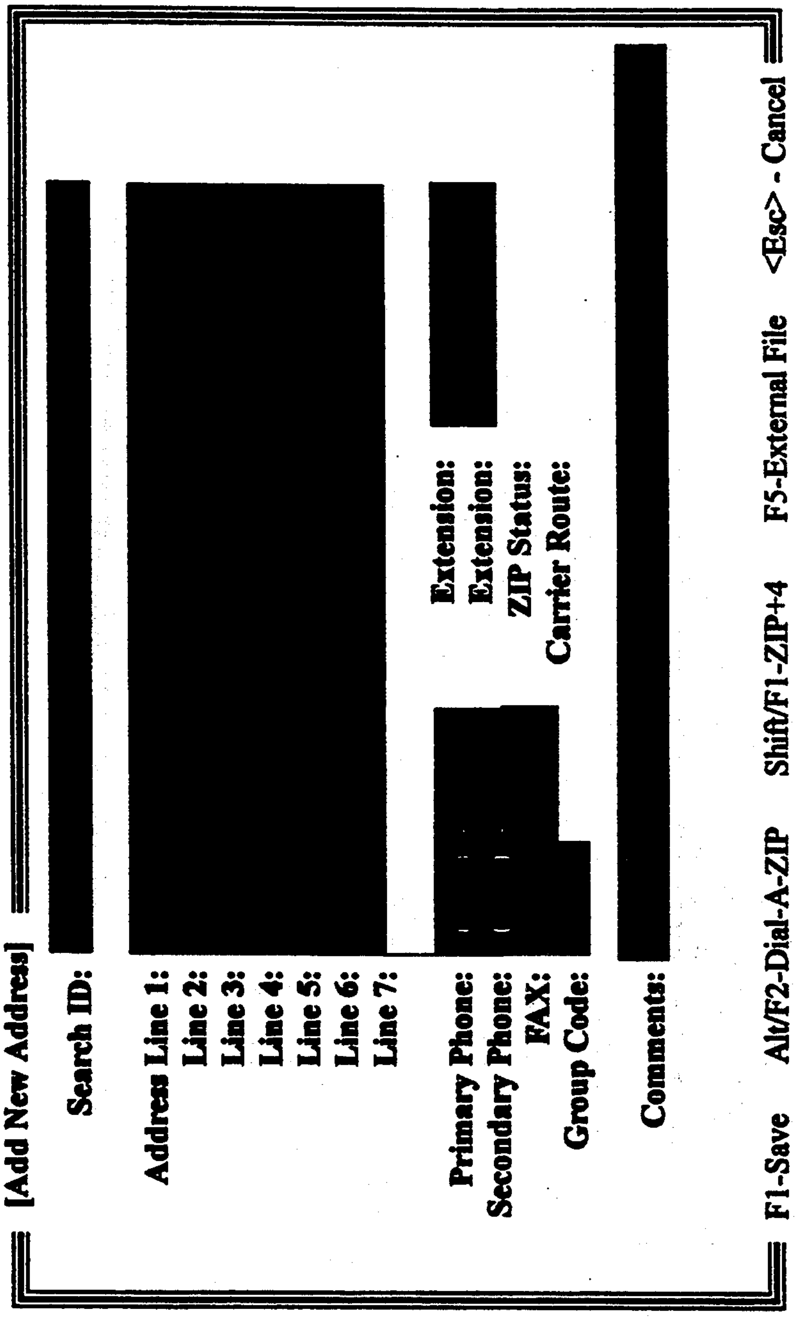
FIG. 5 depicts an input screen used to enter the data needed by a ZIP+4 remote database system to provide a ZIP+4 zipcode.

1. The user enters the address in the PC data base environment provided by the PC envelope/label generating software (such as Envelope Manager). This is a required precursor to printing an address even if the ZIP+4 is known. One version of an input screen to perform this function is shown in FIG. 5.

2. A keystroke option is made available to the user to request a dial-up ZIP+4 query. FIG. 5 shows this key sequence as ALT-F2, although any other keystroke sequence could be utilized.

Figure 6:
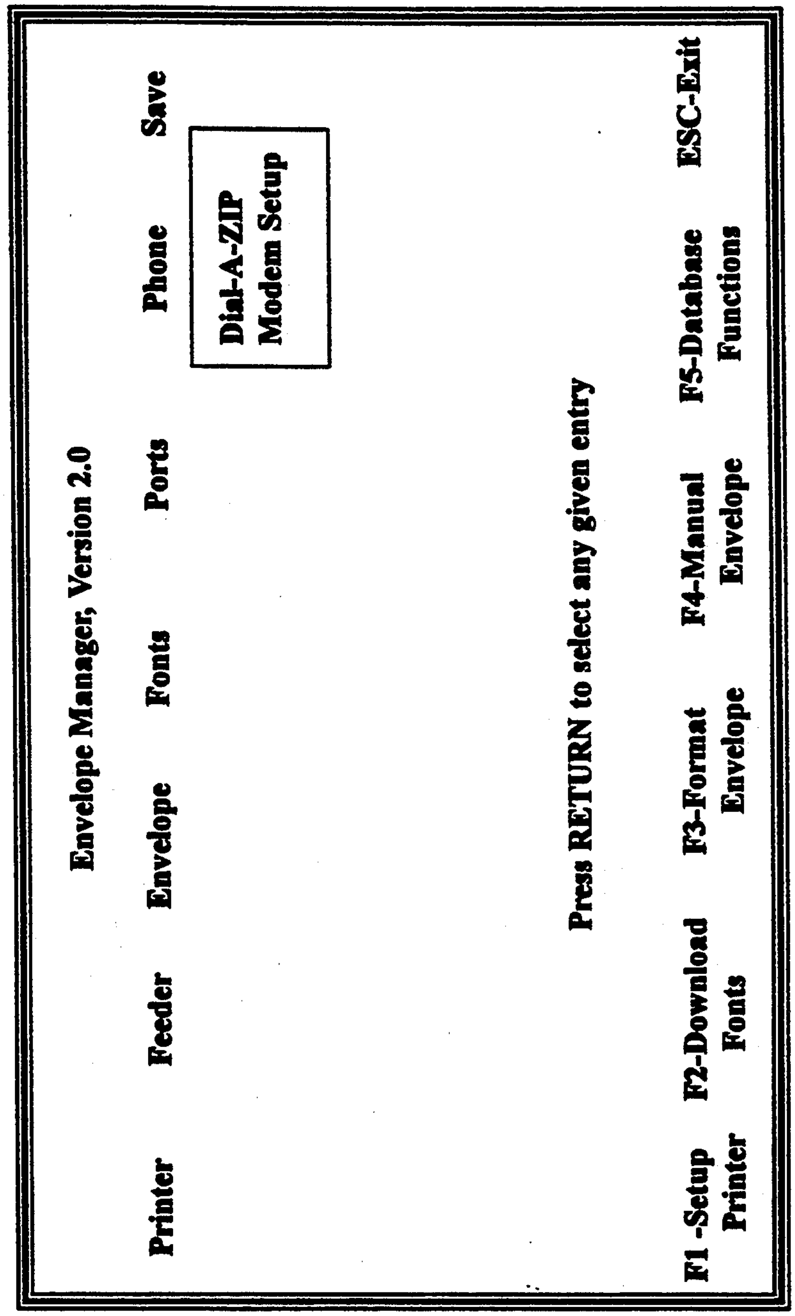
FIG. 6 shows a supervisory input screen for inputting the telephone number of the ZIP+4 database system.

3. Pressing the query key sequence causes the software to dial a phone number which has been previously input under the program's supervisory functions. FIG. 6 shows a supervisory input screen for inputting the ZIP+4 query number. This phone number might be provided by independent service firms or by the U.S. Postal Service.

4. Within approximately 20 seconds, the user input screen shown on FIG. 5 is refreshed with the appropriate ZIP+4 or an error message indicating that a ZIP+4 was not found and why (e.g. invalid state name, etc.).

5. The user may then print the POSTNET barcoded mail piece and/or save this validated address.

It is important to stress the software system's ability to store addresses. Most low and medium volume mailers send material to the same addressees repeatedly. By supporting a data base of names and address (such as Envelope Manager does), a ZIP+4 query need only be performed once on a given address. From that point on, the correct ZIP+4 address will be always available on the user's system for subsequent POSTNET barcoded envelope or label generation.

I claim:

1. A distributed computer system: comprising:

a plurality of end-user computers; and a first computer including a modem for receiving calls from said plurality of end-user computers, and a ZIP+4 database with query response means coupled to said modem for transmitting to said plurality of end-user computers ZIP+4 zipcode values retrieved from said ZIP+4 database in response to address information transmitted to said first computer via said modem;

each of said plurality of end-user computers including:

a modem for communicating with said first computer;

address input means for receiving address information input by a user of each of said plurality of end-user computers and for storing said user input address information;

remote zipcode retrieval means for transmitting said stored address information to said first computer via said modem, receiving ZIP+4 zipcode values from said first computer via said modem, and for storing and inserting said received ZIP+4 zipcode values into said stored address information;

a printer;

envelope printing means for directing said printer to print barcodes on envelopes, each said barcode representing one of said ZIP+4 zipcode values received from said first computer; and a keyboard with a multiplicity of keys for entering said address information;

said address input means including means for displaying said stored address information in a predefined screen format and means for responding to a predefined single user command when said address input means is displaying said stored address information in said predefined screen format by invoking said remote zipcode retrieval means to call said first computer, to transmit said displayed address to said first computer, to receive in said each of said plurality of end-user computers a corresponding ZIP+4 zipcode value from said first computer, and to insert the received ZIP+4 zipcode value into said displayed address.

2. The distributed computer system of claim 1, wherein said modem in said first computer and said modem in each of said plurality of end-user computers system comprises an industry-standard telecommunications modem coupled to a commercial telephone line.

3. The distributed computer system of claim 1, wherein said ZIP+4 database contains a national ZIP+4 database, and said query response means compares said received address information against said national ZIP+4 database and returns a valid ZIP+4 zipcode value or explanatory error message.

4. The distributed computer system of claim 1, wherein said first computer includes a multiplicity of modems coupled to a like number of telephone lines and said query response means includes means for responding to address information received simultaneously from multiple ones of said plurality of end-user computers.

5. The distributed computer system of claim 1, wherein said predefined single user command comprises a predefined single user keystroke entered on said keyboard.

6. A computer implemented method of distributed ZIP+4 zipcode values, comprising the steps of:

storing in a first computer a ZIP+4 database;

said first computer receiving address information transmitted to said first computer by other computers, said other computers including a plurality of end-user computers, and transmitting to said other computers ZIP+4 zipcode values retrieved from said ZIP+4 database in response to said address information transmitted to said first computer by said other computers; and each of said plurality of end-user computers including a keyboard with a multiplicity of keys and a printer, said each of said plurality of end-user computers performing the steps of:

receiving address information input by a user of one of said plurality of end-user computers and storing said user input address information;

displaying said stored address information in a predefined screen format;

responding to a predefined single user command when displaying said stored address information in said predefined screen format by calling said first computer, transmitting said displayed address to said first computer, receiving in said one of said plurality of end-user computers a corresponding ZIP+4 zipcode value from said first computer, and inserting the received ZIP+4 zipcode value into said displayed address; and printing barcodes on envelopes, each said barcode representing one of said ZIP+4 zipcode values received from said first computer.

7. The method of claim 6, wherein said ZIP+4 database contains a national ZIP+4 database, and said first computer compares said received address information against said national ZIP+4 database and returns a valid ZIP+4 zipcode value or explanatory error message.

8. The method of claim 6, including:

providing said first computer with a multiplicity of modems coupled to a like number of telephone lines; and said first computer responding to address information received simultaneously from multiple ones of said plurality of end-user computers.

9. The method of claim 6, wherein said predefined single user command in said responding step comprises a predefined single keystroke entered on said keyboard.

* * * * *